UNITED STATES PATENT OFFICE.

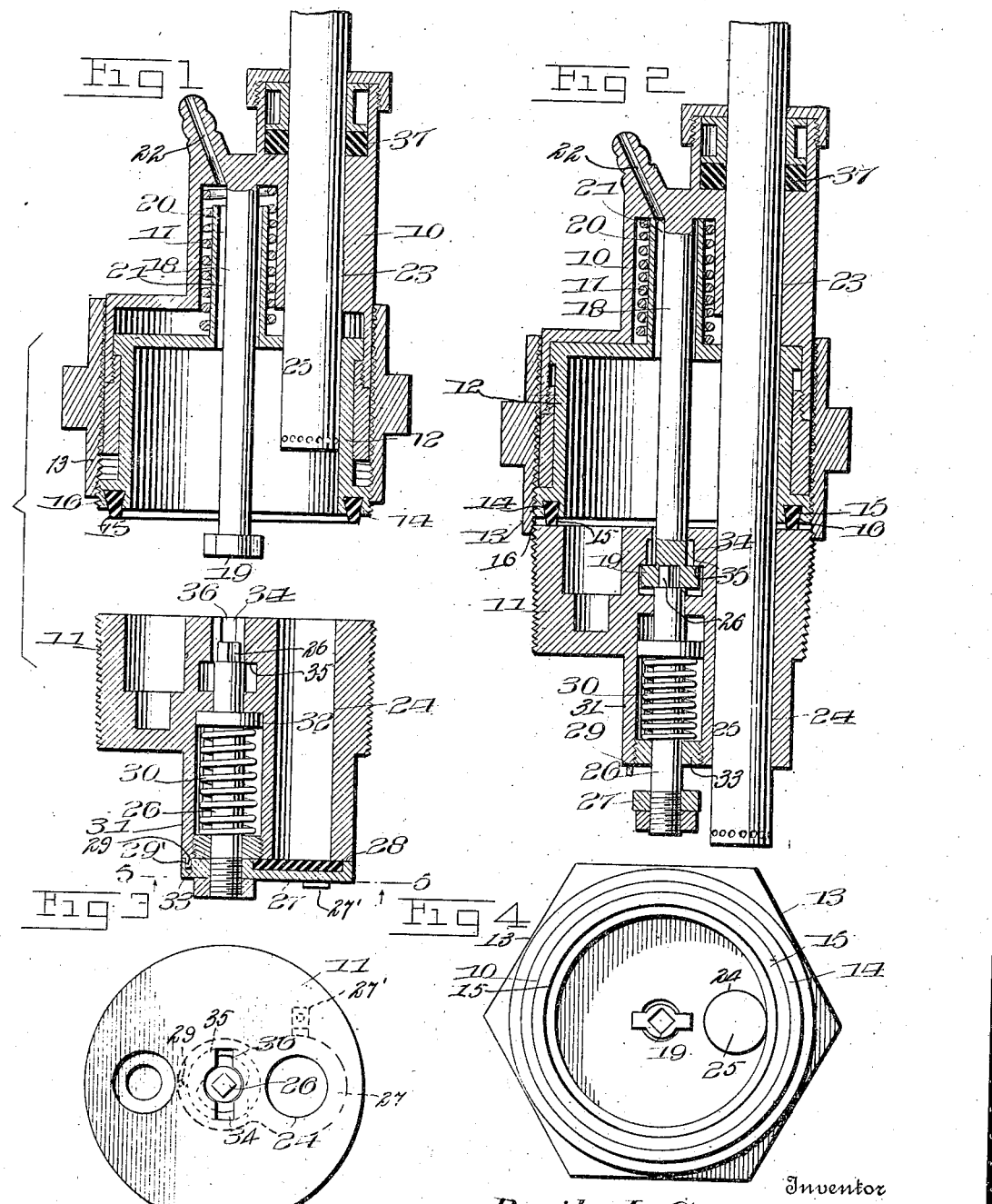

BASILE JOHN CARAVOTAS, OF SAN FRANCISCO, CALIFORNIA.

DEVICE FOR TAPPING KEGS OR BARRELS.

1,187,256.

Specification of Letters Patent. Patented June 13, 1916.

Application filed March 15, 1913. Serial No. 754,428.

*To all whom it may concern:*

Be it known that I, BASILE J. CARAVOTAS, (a person who has declared his intention to be a naturalized American,) native of Palias, Greece, residing at San Francisco, in the county of San Francisco and State of California, have invented new and useful Improvements in Devices for Tapping Kegs or Barrels, of which the following is a specification.

An object of the invention is to provide a device for use in tapping kegs or barrels.

The invention embodies, among other features, a device that is preferably used in connection with beer kegs and the like, and in connection with which it is desired to tap the keg in a manner that will permit of forcing a tube therein so that the contents of the keg can be readily withdrawn therefrom.

In the further disclosure of the invention reference is to be had to the accompanying drawings, constituting a part of this specification, in which similar characters of reference denote corresponding parts in all the views, and in which:

Figure 1 is a vertical sectional view of the device showing the casings in disconnected position; Fig. 2 is a similar vertical sectional view showing the casings in connected position and the tube 25 pushed through the passage 24 in the lower casing 11; Fig. 3 is a plan view of the lower casing; Fig. 4 is a bottom plan view of the upper casing.

Referring more particularly to Figs. 1 to 4 inclusive, use is made of an upper casing 10 and a lower casing 11, the upper casing 10 being revolubly mounted on a collar 12 arranged within the lower part of the upper casing with a coupling member 13 having connection with a rim 14 of the collar 12 and adapted for threaded connection with the upper periphery of the lower casing 11, the mentioned lower casing 11 being also adapted for threaded connection with a suitable barrel or keg that it is desired to tap, the mentioned lower casing being adapted to project into the keg through the bung-hole thereof.

A suitable gasket 15 is mounted in a dovetail slot 16 in the collar 12 and has a depending portion adapted to seat upon the upper face of the lower casing 11 as shown in Fig. 2. It will be noted that the upper casing 10 is slidable vertically on the collar 12, the mentioned upper casing being normally retained in uppermost position by an expansible helical spring 17 encircling a key 18, formed with the upper casing 10 and terminating in a head 19, one end of the spring 17 being adapted to abut against a face of the upper casing 10 and the other end of the spring 17 abutting against the collar 12, a suitable tubular shank 20 being extended from the collar 12 and through which the key 18 extends, the mentioned helical spring 17 being preferably arranged to encircle the shank 20 as shown, with the key 18 spaced from the shank 20 to form a passage 21 having connection with a passage 22 formed in the upper casing 10 and which is adapted to receive an air pipe whereby air can be forced through the lower casing 11 and into the keg.

The casings 10 and 11 are each provided with tubular passages 23, 24 through which a pipe 25 is adapted to be slidably passed, and mounted to slide vertically in the lower casing 11 is a valve rod 26 provided with a laterally extending valve 27 adapted to normally close the lower end of the tubular passage 24, a seat 28 being formed on the lower casing 11 to receive the valve 27 when the casing is moved into closed position, the said valve 27 being rotatable horizontally to a limited extent after it has been pushed inwardly away from the valve seat 28. A pin 29 projects from the lower end of the casing 11 and fits into a hole 29' in the valve 27 when the said valve is drawn against the seat by the spring 30, thus preventing rotation of the valve when in closed position.

An expansible helical spring 30 is arranged within a central cylindrical bore 31 in the casing 11 with an end of the spring abutting against a flange 32 on the valve rod 26 and the other end of the spring abutting against a plug 33 which is screwed into the lower end of the bore 31, thus normally holding the valve 27 on the seat 28. A locking socket 34 is provided on the lower casing 11, in substantial alinement with the key 18 and the upper end of the valve rod 26 projects into the said socket. The lower portion of the socket being enlarged and provided with staggered lugs 35', is enlarged and provides a shoulder 35 against which the upper surface of the elongated head 19 of the key 18 is pressed by the spring 17 after the said head has been pushed down into the socket and turned so that the head 19 engages below the shoulder 35. The square head of the valve rod 26 fits into the square hole in the head 19 and the valve is therefore pushed down below the pin 29 and open as shown in Fig. 2 in the drawings.

In the use of the device described, the lower casing 11 is first threaded into the bung-hole of a keg or barrel and the upper casing 10 is then held in the hand of the operator in a position which will enable the elongated head 19 on the key 18 to be passed through the elongated opening in the locking socket 34 of the lower casing. When this is accomplished the upper squared end of the valve rod 26 will be located in the squared recess in the head of the key 18, with the depending portion of the gasket 15 on the collar 12 contacting with the lower casing 11. The coupling member 13 may now be operated to threadedly connect the upper casing 12 with the lower casing 11.

It will of course be understood that the pipe 25 has preferably been inserted in the passage 23 in the casing 10 with the lower end of the pipe located in an opening in the top of the collar 12 prior to the connection of the casings 10 and 11, the pipe being held against accidental displacement from the position described by a rubber gasket 37 mounted in the casing 10.

If it is desired to force air into the keg or barrel through the passage 22 by means not shown in the drawing the casing 10 is forced downwardly in a vertical direction against the action of the spring 17, while the key 18 through its connection with the valve rod 26 will also move said stem downwardly against the action of the spring 30 thereby removing the pin 29 from the hole 29' in the valve 27, thus air forced into the upper casing 10 may enter the barrel or keg through the passage 24 in the casing 11 as long as the casing 10 is maintained in a depressed position.

When it is necessary that the passage 24 remain open for any length of time or when it is desired to pass the lower end of the pipe 25 through the passage 24 in the casing 11 and into the barrel or keg to which the device is attached the casing 10, after having been depressed, may be rotated or given a half turn to cause the pipe 25 to register with the passage 24 in the casing 11, and also to move the valve 27 from beneath said passage. When this has been accomplished the pipe 25 may be passed through the passage 24 into the barrel in order that the contents thereof may be ejected through the pipe 25 by the air confined within the barrel. It will be noted in reference to Fig. 2 in the drawing that the elongated head of the casing is now in the lowermost portion of the locking recess 34 with the upper surface of said head contacting with the locking flange 35 of said socket. It will be further noted that during the partial rotation of the casing 10 and the collar 12 within the ring 13 the gasket 15 has been compressed sufficiently to form a tight joint between the casings 10 and 11.

It might also be stated that when the valve 27 has been moved from beneath the passage 24 in the casing 11 and the pipe 25 positioned within said passage the only escape for the contents of the barrel is through the pipe 25.

To insure the pin 29 registering with the hole 29' when the valve 27 is moved to a position to cover the valve seat 28 a stop member 27' is provided as shown in dotted lines in Fig. 3 in the drawing.

Having thus described my invention, I claim:

1. In a device of the class described, the combination with a lower casing, of an upper casing, a collar within the upper casing, said upper casing being movable on the collar, a coupling in threaded connection with the collar and adapted for threaded connection with the lower casing to connect said casings, an expansible spring mounted upon said collar and contacting with said upper casing to normally retain the upper casing in uppermost position, a valve rod in the lower casing mounted to slide and turn therein, a valve on the valve rod normally closing a passage in the lower casing, a pipe arranged in the upper casing and manually operable to extend the same through the passage in the lower casing, and a key on the upper casing movable vertically therewith and adapted to engage said valve rod and slide and turn the same in the lower casing to move the above mentioned valve into open and closed position.

2. In a device of the class described, the combination with a lower casing, of an upper casing, a collar within the upper casing, said upper casing being movable on the collar, a coupling threadedly connected with said collar and adapted for threaded connection with the lower casing whereby said casing may be connected, an expansible spring mounted upon the collar and contacting with said upper casing to normally maintain the upper portion of the first mentioned casing superposed above the collar, a pipe arranged in the upper casing adapted to extend through a passage in the lower casing, a valve rod in the lower casing mounted to slide and turn therein, a valve on the valve rod normally closing the passage in the lower casing, a key on the upper casing and movable vertically therewith to engage the said valve rod and slide and turn the same in the lower casing to move said valve into open and locked position, and locking flanges on the lower casing adapted to contact with said key to secure said valve in an open position.

3. In a device of the class described, the combination with a lower casing, of an upper casing, a collar within the upper casing, said upper casing being movable on the collar, a coupling in threaded connection with said collar adapted for threaded connection with the lower casing to connect said casings, an expansible spring mounted upon said collar and contacting with said upper casing to normally retain the upper casing in uppermost position, a valve rod in the lower casing mounted to slide and turn therein, a valve on the valve rod normally closing a passage in the lower casing, a pipe arranged to extend through a passage in the upper casing adapted to be manually passed through the passage in the lower casing, a key on the upper casing movable vertically therewith and provided with a head to engage said valve rod and slide and turn the same in the lower casing to move said valve into open and closed position, locking flanges on the lower casing adapted to contact with the upper surface of the head on said key to secure the key in locked position when the valve is in open position, and an expansible spring encircling said valve rod with an end of the spring engaging the valve rod and the opposite end of the spring engaging the lower casing to normally retain said valve in position to close the above mentioned passage in the lower casing.

4. In a device of the class described, the combination with a lower casing for connection with a keg, of an upper casing, means for revolubly locking the upper casing on the lower casing, a valve rod in the lower casing, a valve member on the valve rod and adapted to normally close a passage in the lower casing, a pipe for insertion in a passage in the upper casing and adapted to be manually extended into a passage in the lower casing, and a key on the said upper casing and revoluble therewith to engage and revolve the said valve rod to move the said valve into open position and uncover the passage in the lower casing.

5. In a device of the class described, the combination with a lower casing for connection with a keg, of an upper casing, means for revolubly locking the upper casing on the lower casing, a valve rod in the lower casing, a valve member on the valve rod and adapted to normally close a passage in the lower casing, a pipe for insertion in a passage in the upper casing adapted to extend into a passage in the lower casing, a key on the said upper casing and revoluble therewith to engage and revolve the said valve rod to move the said valve into open position and uncover the passage in the lower casing, and means mounted in the upper casing to engage the said pipe and secure the same against accidental movement in the said casings.

6. In a device of the class described, the combination with a lower casing, of an upper casing for connection with the lower casing and revoluble thereon, a valve on the lower casing and normally closing a passage therein, a pipe for insertion in a passage in the upper casing and extending into the passage in the lower casing, and a key on the upper casing and revoluble therewith to move the said valve into open position to uncover the passage in the lower casing.

7. In a device of the class described, the combination with a lower casing, of an upper casing for connection with the lower casing and revoluble thereon, a valve on the lower casing and normally closing a passage therein, a pipe for insertion in a passage in the upper casing and extending into the passage in the lower casing, a key on the upper casing and revoluble therewith to move the said valve into open position to uncover the passage in the lower casing, and a pin on the lower casing for limiting the swing of the said valve.

In testimony whereof I affix my signature in presence of two witnesses.

BASILE JOHN CARAVOTAS.

Witnesses:
   Geo. F. Cavalli,
   O. Piodi.